S. G. BAITS.
UNIVERSAL JOINT.
APPLICATION FILED NOV. 17, 1919.

1,356,899.

Patented Oct. 26, 1920.

INVENTOR:
Stuart G. Baits
by Macleod, Calver, Copeland & Dike
Attys

UNITED STATES PATENT OFFICE.

STUART G. BAITS, OF DETROIT, MICHIGAN, ASSIGNOR TO ESSEX MOTORS, OF DETROIT, MICHIGAN, A CORPORATION OF MICHIGAN.

UNIVERSAL JOINT.

1,356,899.   Specification of Letters Patent.   Patented Oct. 26, 1920.

Application filed November 17, 1919. Serial No. 338,434.

*To all whom it may concern:*

Be it known that I, STUART G. BAITS, a citizen of the United States, residing at Detroit, county of Wayne, State of Michigan, have invented a certain new and useful Improvement in Universal Joints, of which the following is a specification, reference being had therein to the accompanying drawings.

My invention has for its object to provide a universal joint for use with the propeller shafts of motor vehicles and for similar purposes which shall not be subject to the difficulties heretofore experienced. As is well known to users of motor vehicles, the universal joint has been a chief source of annoyance, owing to the fact that it is difficult to lubricate, retains the lubricant for only a short time, throws the lubricant over other parts of the vehicle and becomes noisy and rattles or jingles. One type of universal joint commonly in use has a pair of overlapping spherical casings, and these casings are held in contact with each other by a spring, a tight joint between them being made by a packing of felt or the like. Only so much lubricant can be retained in such a universal joint when it is not rotating as will not raise the level above the lowest point of the edge of the spherical casing, since, if more lubricant is put into the casing, it will run out over the edge. As this space may be conveniently described as a slice of a sphere, the grease capacity is extremely small. Furthermore, the rapid rotation of the shaft produces centrifugal force which tends to force the lubricant out of the universal joint, and the constant movement of the packing back and forth works or pumps the grease out.

The novel universal joint embodying my invention has two important features. First, both of the yokes lie on the same side of a plane passing through the axes of the pivot pins of the spider, the axial portion of one of the yokes passing through a central hole in the spider; and second, there is, in the plane of the axes of the pivot pins, a clear space surrounding a spherical enlargement on the axial portion of one of the yokes which is engaged by the inturned edge of a casing to contain the lubricant. This casing is cylindrical and can be made of relatively large size if desired. The edge of the casing forming the lowest point is relatively near the axis of the joint and, therefore, the casing has a very large grease capacity when not rotating. The casing is so shaped that the rotation tends to hold the lubricant in the casing rather than to throw it out. The casing comprises only a single member, and there are no springs and no packing so that there is nothing to rattle or jingle, and the grease will not be pumped out by the repeated angular movement of the propeller shaft.

The invention will be fully understood from the following description when taken in connection with the accompanying drawings, and the novel features thereof will be pointed out and clearly defined in the claims at the close of this specification.

In the drawings, Figure 1 is a vertical section of a universal joint embodying the invention.

Figure 1:
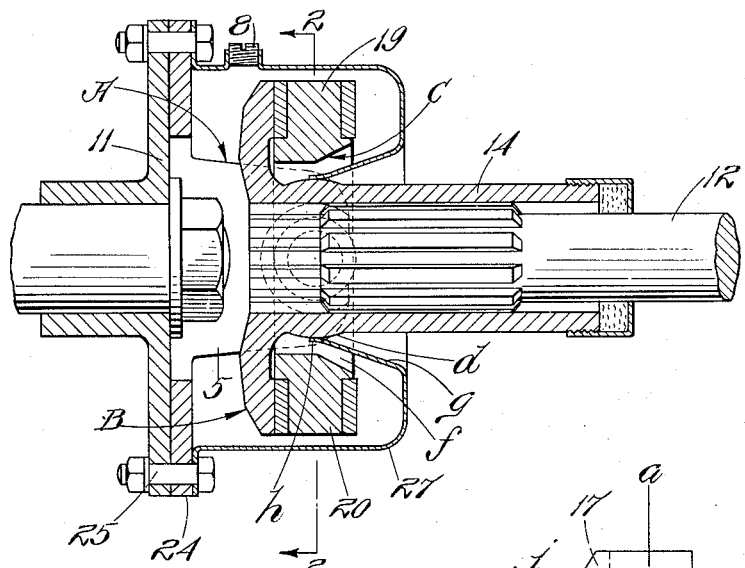
Figure 3:
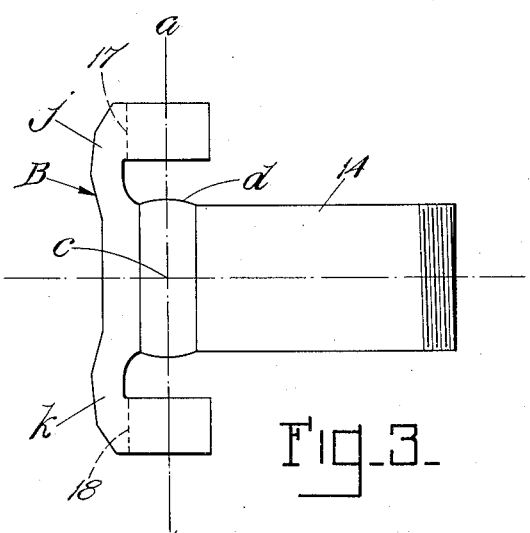
Fig. 3 is a detail view of the yoke B.
Figure 2:
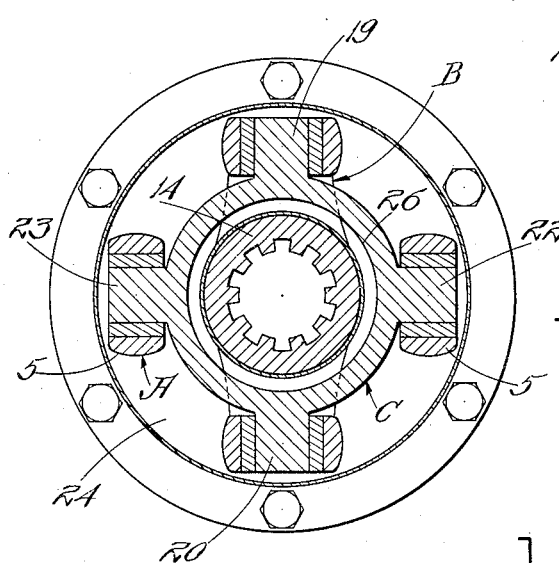
Fig. 2 is a section taken on line 2—2 of Fig. 1.

Referring now to the drawings, there is shown at 11 a flanged member and at 12 the propeller shaft. Either of these may be considered to be the driving or the driven member. The universal joint embodying my invention unites these and consists primarily of two yokes A and B and a spider C provided with two pairs of oppositely disposed pivot pins 19 and 20, and 22 and 23. In the drawings, I have shown the axial portion 14 of the yoke B to be in the form of an internally splined sleeve which coöperates with the splined end of the propeller shaft 12, to permit longitudinal movement of the shaft, this being the ordinary construction for use with the so-called Hotchkiss drive. The spider C has a large central hole 26 in it. The axial portion 14 of the yoke B passes through this hole in the spider. The yoke includes two radial arms $j$ and $k$ which are bent backwardly on themselves and are provided with holes 17 and 18 for the reception of the pivot pins 19 and 20. The axis of these pivot pins 19 and 20, as indicated by the dot-and-dash line $a$—$b$, and the axis of the pins 22 and 23, lie in a single plane and intersect each other at the point $c$ which is the center of the universal joint. This point lies in the axis of the axial portion of the yoke B. The yoke A consists of a disk 24 and two lugs 5 having holes therein to receive the two pivot pins 22 and 23.

It will thus be seen that the radial portions of both yokes lie on the same side of the plane in which the axes of the pivot pins lie, and that in this respect, my universal joint is entirely different from those heretofore in use.

On the axial portion 14 of the yoke B there is formed a spherical portion $d$ about the point $c$. This spherical portion $d$ is of such a size that a space $f$ is left between it and the spider C. This space extends on both sides of the transverse plane passing through the center $c$ of the universal joint.

At 27 is shown the universal joint casing secured to the yoke A by the bolts 25. This casing is cylindrical in form and is turned inwardly forming a portion $g$ which extends into the space $f$ between the spider C and the spherical enlargement $d$. The edges of the inturned portion $g$ are bent slightly as shown at $h$ and contact with the spherical enlargement $d$. At 8 is shown a plug closing the opening through which the lubricant is inserted.

The casing may be filled with grease up to the point $h$ without running out, and since the casing is cylindrical and not spherical in shape, it will hold a relatively large amount of grease. If greater grease capacity is required, this may be easily afforded by increasing the diameter of the casing 27 or by extending it lengthwise of the shaft. It will also be seen that owing to the inturned flange $g$, the centrifugal force tends to keep the grease in the case rather than to throw it out. Since the radius of the spherical portion $d$ is small, the amount of movement which takes place between the edge $h$ of the flange $g$ and the spherical portion is small, and the joint does not exude or pump out the grease. As shown, the shell is made in one piece and contacts with other members of the universal joint only along the edge of the inturned flange. Jingling and rattling is therefore eliminated. There is no packing which needs to be renewed.

In the foregoing specification, I have described my invention as including a cylindrical casing 27, but I do not intend to limit myself to this form of casing or in fact to the use of any casing, as I believe myself to be the first to produce what may be termed an inverted universal joint in which both yokes lie on the same side of the plane of the axes of the pivot pins. Believing myself to be the inventor of this combination, I intend to claim the same as broadly as possible; and also to claim broadly the use of a casing with this type of joint.

What I claim is,—

1. The improved universal joint having a spider with a centrally disposed hole therein, oppositely disposed pairs of pivot pins exterior to the spider, and two yokes one of which engages a pair of said pivot pins and has an axial portion which extends through said hole in the spider to the opposite side.

2. The improved universal joint having a spider with a centrally disposed hole therein, oppositely disposed pairs of pivot pins at least one pair of which is on the exterior periphery of the spider, and two yokes each of which engages a pair of said pivot pins, the radial portions of both of said yokes lying on the same side of a plane passing through the axes of said pins, and the axial portion of the yoke which engages said pins on the exterior of the yoke extending through said hole in the spider to the opposite side of said plane.

3. In a universal joint the combination of a spider having a centrally disposed hole therein, oppositely disposed pivot pins in pairs on the spider, two yokes each including an axial portion, the cross portions of both of said yokes lying on the same side of the plane passing through the axes of said pins and the axial portion of one of said yokes extending through said hole in the spider to the opposite side of said plane, said axial portion being provided with a spherical portion and a cover extending around the yokes and into contact with said spherical portion.

4. The improved universal joint including a driving and a driven member, a spider having pairs of oppositely disposed pivot pins located exteriorly to the spider, yokes for said driving and driven members engaging opposite pairs of said pivot pins, one of said yokes being provided with a radial portion engaging the pins on the exterior of the spider and an axial member which passes through a hole in said spider to the side opposite its radial portion for engagement with the driving or driven member, and the other member being provided with a casing surrounding the universal joint and having a portion which extends inwardly and toward the member to which it is secured.

5. The improved universal joint having a spider with oppositely disposed pivot pins and having in the plane of the axes of its pivot pins a clear space surrounding an axial member, said axial member having a spherical portion formed about the point where its axis passes through said plane and a casing extending into said space and engaging said spherical portion.

6. The improved universal joint which includes a spider having pairs of oppositely disposed pivot pins, two yokes each engaging an oppositely disposed pair of said pins, one of said yokes having an axial portion provided with a spherical enlargement formed about a center lying in the plane of the axes of said pins, and the other of said yokes being provided with a casing having an edge substantially in contact with said spherical enlargement.

7. The improved universal joint which includes a spider having pairs of oppositely disposed pivot pins, two yokes each engaging an oppositely disposed pair of said pins, one of said yokes having an axial portion provided with a spherical enlargement formed about a center lying in the plane of the axes of said pins, and the second of said yokes being provided with a casing having an exterior portion which extends beyond the plane of the pivot pins and an interior portion which extends back toward the second yoke and into contact with said spherical enlargement.

In testimony whereof I affix my signature.

STUART G. BAITS.